(No Model.)
2 Sheets—Sheet 1.
E. F. CHUBBUCK.
POTATO PLANTER.
No. 503,695. Patented Aug. 22, 1893.
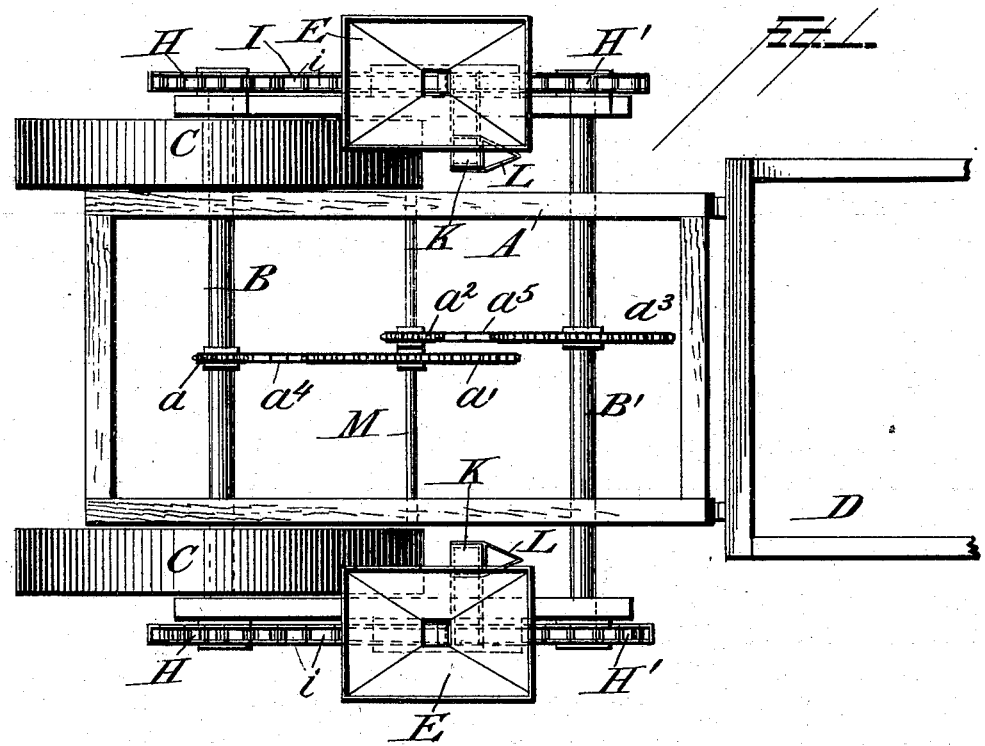
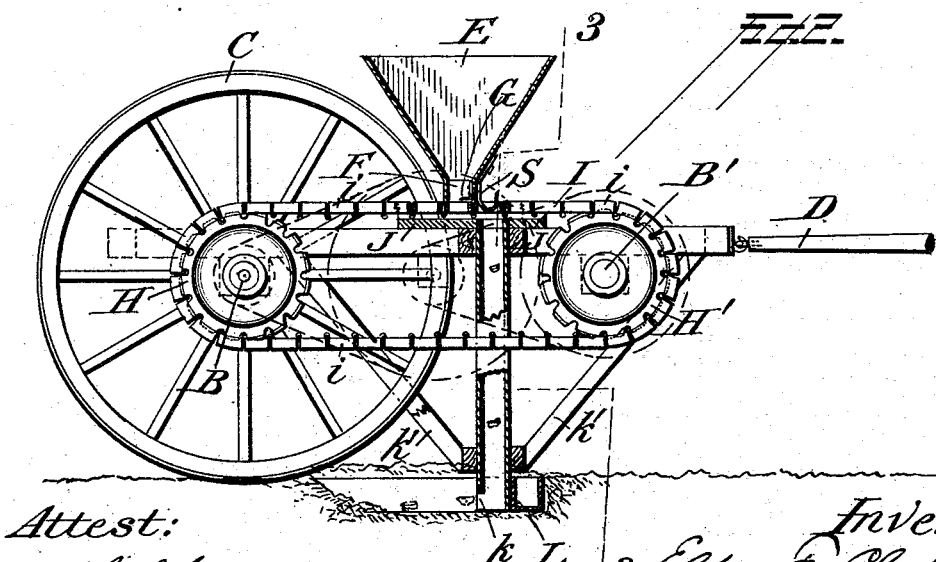
Attest:
F. H. Schott
Alfred T. Gage
Inventor:
Elton F. Chubbuck
by W. D. Henderson
Attorney.

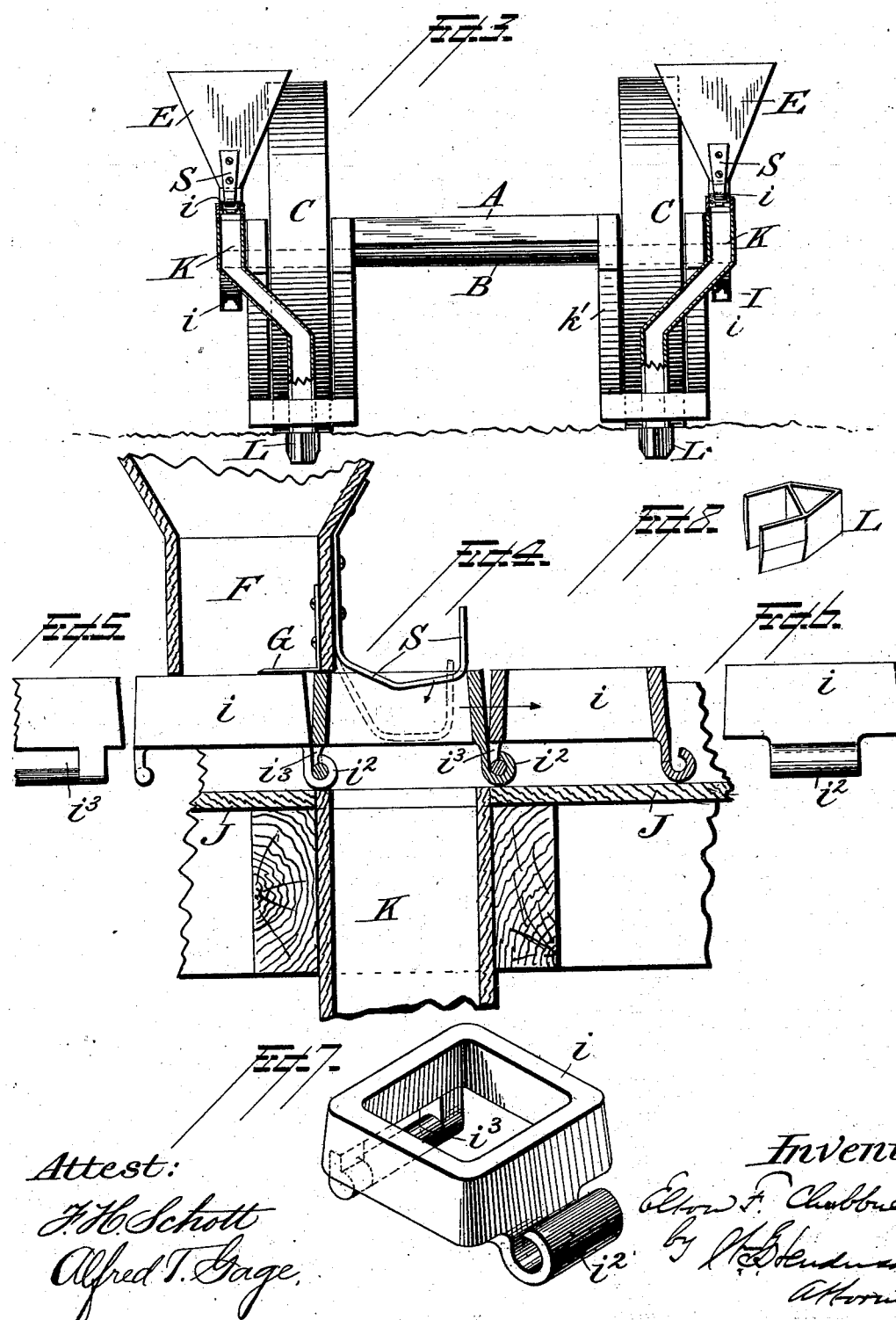

UNITED STATES PATENT OFFICE.

ELTON F. CHUBBUCK, OF HASKINVILLE, NEW YORK.

POTATO-PLANTER.

SPECIFICATION forming part of Letters Patent No. 503,695, dated August 22, 1893.

Application filed November 30, 1892. Serial No. 453,562. (No model.)

*To all whom it may concern:*

Be it known that I, ELTON FAY CHUBBUCK, a citizen of the United States, residing at Haskinville, in the county of Steuben and State of New York, have invented certain new and useful Improvements in Potato-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in planters, and has for its object the provision of such a device as will be particularly adapted to the planting of potatoes, so that the latter can be placed in a hopper without any previous preparation, and fed into a cutting box in which they are cut into suitable pieces for seed and conveyed therefrom and deposited in a furrow at suitable intervals.

The invention consists primarily of a cutting box in which a longitudinal passage is formed through which a conveyer moves, of a knife secured in the said box parallel with the conveyer and flush with the top of the passage, the conveyer being adapted to draw a potato which may project into a bucket of the same against the knife to sever the portion contained in the bucket and to carry the same to a depositing spout, into which it is forced by a spring.

It consists secondarily of the peculiarly constructed mechanism whereby the several parts hereinbefore mentioned, and their adjuncts are supported and operated, which construction as well as that previously mentioned, will be hereinafter specifically described, pointed out in the appended claims and illustrated in the accompanying drawings.

In the accompanying drawings in which similar letters of reference designate corresponding parts, Figure 1 is a plan view of a planter embodying the invention. Fig. 2 is a side elevation of the same, being partly in section. Fig. 3 is a section on the line 3—3 of Fig. 2. Fig. 4 is a detail view, showing a longitudinal section of the cutting box, the conveyer, the spring for forcing the seed from the links of the conveyer, and several of their adjuncts. Fig. 5 is a detail view showing a side of one of the links forming the conveyer. Fig. 6 is a similar view showing the opposite side of the same. Fig. 7 is a detail perspective view showing one of the links complete, and Fig. 8 is a detail perspective view showing the plow or furrow opener.

Referring to the drawings by letter, A designates the main frame of the machine of any construction suitable in the premises, mounted near its rear end upon the shaft B carried by the wheels C, C, the said wheels being keyed on the said shaft so that the latter will be rotated with the former, and has attached to its forward ends the thills D, D or any other suitable device for propulsion.

As one side of the machine is an exact duplicate of the other, only one will be described, as the same description can be applied to both.

E designates a hopper mounted on an extension of the main frame outside and in advance of the carrying wheel. The hopper may be of any construction adapted to feed the potatoes into a cutting box F attached to its lower end. The cutting box has its front and rear sides cut away to form a passage, the purpose of which will be explained farther on. To the front side of the cutting box, a knife G is attached with its blade parallel with the passage, and its under face flush with the top of the same.

H and H' designate two sprocket wheels respectively mounted on the ends of the shaft B and B'; the former being loosely mounted and the latter being keyed in place. The sprocket wheels carry a conveyer or sprocket chain I consisting of rectangular shaped links $i\ i$, a side of each link being extended to form a hook $i^2$ adapted to engage with a loop $i^3$ formed in the extension of the adjacent side of a preceding link. The chain or conveyer is so mounted as to pass through the passage of the cutting box and its size is such as to completely fill the said passage, and the top of each link to pass immediately below the knife. A plate J is secured on the frame immediately below the cutting-box so as to support the chain in its proper position on its passage through the cutting box and over the depositing spout.

K designates the depositing spout which leads from an opening formed in the plate J immediately in front of the cutting box, to a position where it will deposit the seed in front of the wheel C. To the front face of the lower end of the spout, the plow or furrow opener L is secured. This opener (see Fig. 8) has, substantially, a triangular shape at its forward end, and its rear end consists of two parallel sides adapted to partly inclose the end of the spout. The rear lower face of the spout is cut away, as at $k$, to allow a free egress of the seed. The spout is supported against longitudinal strain by the braces $k'$ $k'$.

S designates a U-shaped spring, with one of the limbs much longer than the other and fastened to the front of the cutting box and hopper, the long limb allowing the limb to be securely fastened in place. The spring is so placed and of such a size as to force itself into the links as they successively come beneath it, the contacting surface of the spring being rounded so that but slight resistance is offered to the passage of the chain.

On the driving shaft B is keyed the sprocket wheel $a$ and on the shaft M, mounted parallel with and intermediate of the shafts B and B', are keyed the large and small sprocket wheels $a'$ and $a^2$ and upon the shaft B' is keyed the large sprocket wheel $a^3$. The wheel $a$ is connected with the wheel $a'$, and the wheel $a^2$ with the wheel $a^3$ by the sprocket chains $a^4$ and $a^5$, respectively. Through this mechanism motion given to the shaft B will be conveyed to the shaft B' and consequently to the sprocket chain or conveyer I to move the latter forward beneath the hopper.

The operation of the device is as follows: The hopper being previously filled with potatoes, the machine is put in motion and through the connecting mechanism the sprocket chain or conveyer I is made to move through the cutting box. One of the potatoes will, when a link of the chain is in register with the cutting box, drop into the link, and as the latter advances, the potato will be drawn against the knife and a portion of it severed. As the chain progresses the piece of potato will be carried forward until the link is in register with the depositing spout, into which it will drop or be forced by the spring S and thereby be connected to the furrow opened by the plow L and then be covered by the wheel C. The gears and their adjuncts which connect the shafts B and B' are so formed and connected that the passage of a link through the cutting box will be so timed as to deposit the seed at the desired intervals.

Having thus described my invention, what I claim, and desire to secure by Letters Patent, is—

1. In a planter, the combination of a cutting box, the knife secured therein, the conveying or sprocket chain composed of links hinged to one another and passing across an opening in the lower part of the said cutting box, the said links being formed to register with the cutting box, and the depositing spout adapted to register with the links after they have passed from the cutting box, substantially as described.

2. In a planter, the combination of the cutting box having a passage therein, the knife secured in the said box parallel with the said passage, the conveying or sprocket chain composed of links hinged to one another and moving across the said passage, the said links being formed to register with the opening in said box, and the depositing spout with its upper opening so situated as to register with the open links after they have left the cutting box, substantially as described.

3. In a planter, the combination of the cutting box having a longitudinal passage therein, the knife secured in the said box parallel with the said passage and flush with the top of the same, the sprocket chain moving in the said passage formed of links of such a shape and size as to register with the cutting box, the depositing spout with its upper opening so situated as to register with the links of the conveyer after they have left the cutting box, and the spring mounted above the upper opening of the depositor to force the seed from the links into the same, substantially as described.

4. In a planter, the combination of the cutting box provided with a longitudinal passage, the conveying chain moving through the said passage, the knife mounted in the said box immediately above the said conveyer and parallel with the same, the parallel shafts, one of which is driven by the carrying wheels, the intermediate gear connecting the said shafts, the sprocket wheels mounted on the said shafts and carrying the said conveying chain, and the depositing spout, substantially as described.

5. In a planter, the combination of the cutting box having a longitudinal passage formed therein, the conveying chain moving through the said passage consisting of links having a shape substantially the same as that of the cutting box and having a side extended to form a hook adapted to engage with the loop formed in an extension of the adjacent side of a preceding link, the knife mounted in the said cutting box, and the depositing spout having its upper opening in a position to register with a link after it has left the cutting chamber, substantially as described.

6. In a planter, the combination of the frame, the wheels carrying the same, the cutting box mounted on the frame and having a longitudinal passage formed therein, the hopper leading to the cutting box, the conveyer moving through the said passage, the depositing spout having its upper opening in such a position as to register with a link after it has left the cutting box and its lower end opening in front of the carrying wheel, the plow fixed to the lower end of the said spout, and the spring mounted above the upper opening of the spout to force the seed from the links of the conveyer into the same, substantially as described.

7. In a planter, the combination with a hopper, of a conveying chain composed of open links hinged to one another by hooks and loops both of which extend below the walls of the links substantially as shown, said links passing across the discharge opening of the hopper, and being formed to register successively with said discharge opening and permit the material to pass through the links, and a depositing spout adapted to receive the material from the links of the conveying chain, substantially as described.

In testimony whereof I affix my signature in presence of two witnesses.

E. F. CHUBBUCK.

Witnesses:
D. RAY BENNETT,
BERT. MCCONNELL.